(12) United States Patent
Kim et al.

(10) Patent No.: US 11,646,404 B2
(45) Date of Patent: May 9, 2023

(54) LITHIUM SECONDARY BATTERY (71) Applicant: SK INNOVATION CO., LTD., Seoul (KR)

(72) Inventors: Soo Ho Kim, Daejeon (KR); Min Gu Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 423 days.

(21) Appl. No.: 16/657,456

(22) Filed: Oct. 18, 2019

(65) Prior Publication Data
US 2020/0127276 A1 Apr. 23, 2020

(30) Foreign Application Priority Data
Oct. 18, 2018 (KR) .......... 10-2018-0124153

(51) Int. Cl.
H01M 4/131 (2010.01)
H01M 4/525 (2010.01)
H01M 10/052 (2010.01)
H01M 4/1391 (2010.01)

(52) U.S. Cl.
CPC ......... *H01M 4/131* (2013.01); *H01M 4/1391* (2013.01); *H01M 4/525* (2013.01); *H01M 10/052* (2013.01)

(58) Field of Classification Search
None
See application file for complete search history.

(56) References Cited

U.S. PATENT DOCUMENTS

| 2009/0136854 | A1* | 5/2009 | Nakura | H01M 10/0569 429/342 |
|---|---|---|---|---|
| 2015/0340686 | A1† | 11/2015 | Sun | |
| 2016/0156027 | A1 | 6/2016 | Kim et al. | |
| 2019/0013545 | A1* | 1/2019 | Kim | H01M 4/505 |
| 2019/0036154 | A1† | 1/2019 | Kim | |

FOREIGN PATENT DOCUMENTS

| CN | 108604674 A | 9/2018 |
|---|---|---|
| JP | 2009026599 A | 2/2009 |
| JP | 2015215951 A † | 12/2015 |

(Continued)

OTHER PUBLICATIONS

Machine Translation of JP 2009-026599 A (Year: 2009).*

(Continued)

*Primary Examiner* — Robert S Carrico
(74) *Attorney, Agent, or Firm* — IP & T Group LLP (57) ABSTRACT

A lithium secondary battery includes a cathode including a cathode current collector, and a first cathode active material layer and a second cathode active material layer sequentially formed on the cathode current collector, an anode, and a separation layer interposed between the cathode and the anode. The first cathode active material layer and the second cathode active material layer include a first cathode active material particle and a second cathode active material particle, respectively, which have different compositions or crystalline structures from each other, and the first cathode active material particle and the second cathode active material particle include lithium metal oxides containing nickel. The second cathode active material particle has a single particle structure.

12 Claims, 3 Drawing Sheets (56) References Cited

FOREIGN PATENT DOCUMENTS

| KR | 10-2006-0053914 A | 5/2006 |
|----|-------------------|--------|
| KR | 10-2012-0030774 A | 3/2012 |
| KR | 10-2012-0044651 A | 5/2012 |
| KR | 10-1604509 B1 | 3/2016 |
| KR | 10-1683204 B1 | 12/2016 |
| KR | 10-2017-0063408 A | 6/2017 |
| KR | 10-2017-0093085 | 8/2017 |
| WO | 2012/093797 A2 | 7/2012 |
| WO | 2018/143753 A1 | 8/2018 |
| WO | 2018/186017 A1 | 10/2018 |

OTHER PUBLICATIONS

Machine Translation of WO 2018/143753 A1 (Year: 2018).*
Extended European Search Report issued by the European Patent Office dated Mar. 5, 2020.
Office Action issued by the Korean Intellectual Property Office dated Jan. 21, 2022.
Notice of Allowance for Korean Patent Application No. 10-2018-0124153 issued by the Korean Intellectual Property Office dated Jul. 22, 2022.

\* cited by examiner
† cited by third party

LITHIUM SECONDARY BATTERY

CROSS-REFERENCE TO RELATED APPLICATION AND CLAIM OF PRIORITY

This application claims priority to Korean Patent Applications No. 10-2018-0124153 filed on Oct. 18, 2018 in the Korean Intellectual Property Office (KIPO), the entire disclosure of which is incorporated by reference herein.

BACKGROUND

1. Field

The present invention relates to a lithium secondary battery and a method of manufacturing the same. More particularly, the present invention relates to a lithium secondary battery including a lithium metal oxide-based cathode active material and a method of manufacturing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery, and high capacity, high power output and long life-span may be preferably required in the cathode active material. However, as an application of the lithium secondary battery has been expanded, stability in a harsh condition such as high temperature or low temperature may be additionally needed in the lithium secondary battery. For example, when a penetration by an external object occurs through the lithium secondary battery, thermal stability for preventing ignition or short-circuit may be needed in the lithium secondary battery or the cathode active material.

However, the cathode active material for implementing the above properties may not be easily achieved. For example, Korean Published Patent Publication No. 10-2017-0093085 discloses a cathode active material including a transition metal compound and an ion adsorbing binder, which may not provide sufficient life-span and stability.

SUMMARY

According to an aspect of the present invention, there is provided a lithium secondary battery having improved operational stability and reliability.

According to exemplary embodiments of the present invention, a lithium secondary battery may include a cathode including a cathode current collector, and a first cathode active material layer and a second cathode active material layer sequentially formed on the cathode current collector, an anode, and a separation layer interposed between the cathode and the anode. The first cathode active material layer and the second cathode active material layer may include a first cathode ac material particle and a second cathode active material particle, respectively, which have different compositions or crystalline structures from each other, and the first cathode active material particle and the second cathode active material particle may include lithium metal oxides containing nickel. The second cathode active material particle may have a single particle structure.

In some embodiments, the first cathode active material particle may have a secondary particle structure in which primary particles are assembled.

In some embodiments, a nickel amount in the second cathode active material particle may be less than that in the first cathode active material particle.

In some embodiments, a molar ratio of nickel among metals except for lithium in the first cathode active material particle may be 60% or more.

In some embodiments, the first cathode active material particle may include a concentration gradient region between a central portion and a surface, and a concentration gradient of at least one metal may be formed in the concentration gradient region.

In some embodiments, a nickel concentration of the first cathode active material particle continuously decreases in the concentration gradient region in a direction from the central portion to the surface.

In some embodiments, the first cathode active material particle may further include cobalt and manganese, and a concentration of manganese continuously increases in the concentration gradient region in a direction from the central portion to the surface.

In some embodiments, the first cathode active material particle includes a lithium metal oxide represented by Chemical Formula 1 below:

[Chemical Formula 1]

In the Chemical Formula 1 above, M1 and M2 are each selected from Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.0$, $0.6\leq a\leq0.95$ and $0.05\leq b+c\leq0.4$.

In some embodiments, a molar ratio of nickel among metals except for ithium in the second cathode active material particle may be a range from 30% to 60%.

In some embodiments, all elements included in the second cathode active material particle are fixed from a central portion to a surface.

In some embodiments, the second cathode active material particle includes at least one of lithium metal oxides represented by Chemical Formulae 2-1, 2-2 and 2-3:

[Chemical Formula 2-1]

In the Chemical Formula 2-1 above, M4 is at least one element selected from Ti, Zr, Al, Mg, Si, B or Cr, and M5 is at least one element selected from Sr, Y, W or Mo. Here, $0<x<1.5$, $2\leq y\leq2.02$, $0.48\leq a\leq0.52$, $0.18\leq b\leq0.22$, $0.28\leq c\leq0.32$, $0\leq d\leq0.25$, $0\leq e\leq0.15$ and $0.98\leq a+b+c\leq1.02$.

[Chemical Formula 2-2]

In the Chemical Formula 2-2 above, M4 is at least one element selected from Ti, Zr, Al, Mg, Si, B or Cr, and M5 is at least one element selected from Sr, Y, W or Mo. Here, $0<x<1.5$, $2\leq y\leq2.02$, $0.313\leq a\leq0.353$, $0.313\leq b\leq0.353$, $0.313\leq c\leq0.353$, $0\leq d\leq0.03$, $0\leq e\leq0.03$ and $0.98\leq a+b+c\leq1.02$.

[Chemical Formula 1]

In the Chemical Formula 2-3 above, M4 is at least one element selected from Ti, Zr, Al, Mg, Si, B or Cr, and M5 is at least one element selected from Sr, Y, W or Mo. Here, $0<x<1.2$, $2<y\leq2.02$, $0.585\leq a\leq0.615$, $0.185\leq b\leq0.215$, $0.185\leq c\leq0.215$, $0\leq d\leq0.03$, $0\leq e\leq0.03$ and $0.98\leq a+b+c\leq1.02$.

In some embodiments, an average diameter of the second cathode active material particle may be smaller than that of the first cathode active material particle.

In some embodiments, a thickness of the second cathode active material layer may be smaller than that of the first cathode active material layer.

According to exemplary embodiments of the present invention as described above, the lithium secondary battery may include a cathode active material layer having a multi-layered structure. The cathode active material layer may include a first cathode active material layer including a cathode active material particle that may have a relatively increased nickel (Ni) amount of a multi-crystalline structure, and a second cathode active material layer including a cathode active material particle that may have a relatively reduced Ni amount of a single particle or a single crystalline structure.

The first cathode active material layer may be adjacent to a current collector to provide high power output and high capacity properties, and the second cathode active material layer may be disposed at an outer side of the cathode to improve thermal stability and penetration stability.

In some embodiments, the cathode active material particle included in the first cathode active material layer may have a concentration gradient to further improve life-span and capacity retention properties.

DETAILED DESCRIPTION OF THE EMBODIMENTS

According to exemplary embodiments of the present invention, a lithium secondary battery including a multi-layered cathode which may include a first cathode active material layer and a second cathode active material layer having different cathode active material particles is provided. The lithium secondary battery may have improved power-output and stability.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first" and "second" are used herein to designate different members or elements, and not to specify or limit an order of objects or the number of elements.

Figure 1:
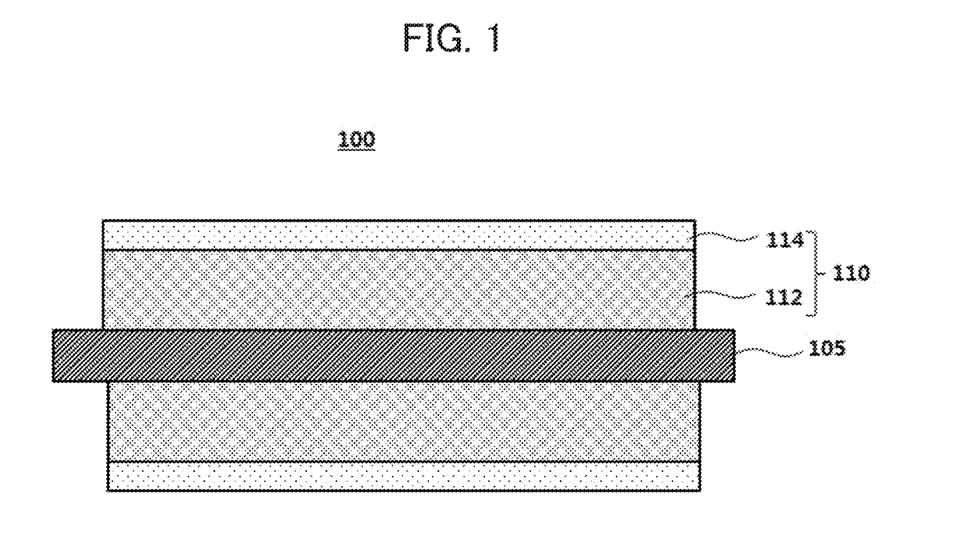
FIG. 1 is a schematic cross-sectional view illustrating a cathode of a lithium secondary battery in accordance with exemplary embodiments.

FIG. 1 is a schematic cross-sectional view illustrating a cathode of a lithium secondary battery in accordance with exemplary embodiments.

Referring to FIG. 1, a cathode 100 may include a cathode active material layer 110 formed on at least one surface of a cathode current collector 105. The cathode active material layer 110 may be formed on both surfaces (e.g., an upper surface and a lower surface) of the cathode current collector 105.

The cathode current collector 105 may include stainless-steel, nickel, aluminum, titanium, copper or an alloy thereof. Preferably, aluminum or an alloy thereof may be used.

In exemplary embodiments, the cathode active material layer 110 may include a first cathode active material layer 112 and a second cathode active material layer 114. Accordingly, the cathode active material layer 110 may have a multi-layered structure (e.g., a bi-layered structure) including a plurality of cathode active material layers.

The first cathode active material layer 112 may be formed on a surface of the cathode current collector 105. For example, the first cathode active material layer 112 may be formed on each of the upper surface and the lower surface of the cathode current collector 105. As illustrated in FIG. 1, the first cathode active material layer 112 may be in a direct contact with the surface of the cathode current collector 105.

The first cathode active material layer 112 may include a first cathode active material particle. The cathode active material particle may include a lithium metal oxide that may have nickel and other transition metals. In exemplary embodiments, an amount (molar ratio) of nickel may be the largest among those of metals except for lithium in the first cathode active material particle, and may be about 60 mol % or more.

In some embodiments, the first cathode active material particle may be represented by Chemical Formula 1 below.

[Chemical Formula 1]

In the Chemical Formula 1 above, M1 and M2 may be selected from Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0.6\leq a\leq0.95$ and $0.05\leq b+c\leq0.4$.

In some embodiments, M1 and M2 may be cobalt (Co) and manganese (Mn), respectively.

For example, nickel (Ni) mayserve as a metal related to a power output and/or a capacity of the lithium secondary battery. As indicated in Chemical Formula 1, the lithium metal oxide having a nickel amount of 0.6 or more may be applied as the first cathode active material particle, and the first cathode active material layer 112 may be formed to be in contact ith the cathode current collector 105. Thus, high power output/capacity may be effectively achieved from the cathode 100.

For example, manganese (Mn) may serve as a metal related to the mechanical and electrical stability of the lithium secondary battery. For example, cobalt (Co) may serve as a metal related to a conductivity or a resistance of the lithium secondary battery.

In an embodiment, in consideration of achieving high power output/capacity from the first cathode active material layer 112, preferably, $0.7\leq a\leq0.9$ and $0.1\leq b\leq0.3$ in Chemical Formula 1.

In an embodiment, a concentration ratio (or a molar ratio) of Ni:Co:Mn in the first cathode active material particle may be about 8:1:1. In this case, power output and capacity may be increased through Ni having the molar ratio of 0.8, and Co and Mn may be included by substantially the same amount to enhance conductivity and life-span of the battery.

In some embodiments, the first cathode active material particle may have a concentration gradient. For example, the first cathode active material particle may include the lithium metal oxide in which a concentration gradient of at least one metal is formed.

In some embodiments, the first cathode active material particle may include a concentration gradient region between a central portion and a surface. For example, the first cathode material particle may include a core region and a shell region, and the concentration gradient region may be formed between the core region and the shell region. The core region and the shell region may each have a uniform or fixed concentration.

In an embodiment, the concentration gradient region may be formed at the central portion. In an embodiment, the concentration gradient region may be formed at the surface.

In some embodiments, the first cathode active material particle may include the lithium metal oxide having a continuous concentration gradient from the central portion of the particle to the surface of the particle. For example, the first cathode active material particle may have a full concentration gradient (FCG) structure having a substantially entire concentration gradient throughout the particle.

The term "continuous concentration gradient" used herein may indicate a concentration profile which may be changed with a uniform trend or tendency between the central portion and the surface. The uniform trend may include an increasing trend or a decreasing trend.

The term "central portion" used herein may include a central point of the active material particle and may also include a region within a predetermined radius from the central point. For example, "central portion" may encompass a region within a radius of about 0.1 μm from the central point of the active material particle.

The term "surface" or "surface portion" used herein may include an outermost surface of the active material particle, and may also include a predetermined thickness from the outermost surface. For example, "surface" or "surface portion" may include a region within a thickness of about 0.1 μm from the outermost surface of the active material particle.

It some embodiments, the continuous concentration gradient tmay include a linear concentration profile or a curved concentration profile. In the curved concentration profile, the concentration may change in a uniform trend without any inflection point.

In an embodiment, at least one metal except for lithium included in the first cathode active material particle may have an increasing continuous concentration gradient, and at least one metal except for lithium included in the first cathode active material particle may have a decreasing continuous concentration gradient.

In an embodiment, at least one metal included in the first cathode active material particle except for lithium may have a substantially constant concentration from the central portion to the surface.

When the first cathode active material particle includes the concentration gradient, the concentration (or the molar ratio) of Ni may be continuously decreased from the central portion to the surface or in the concentration gradient region. For example, a concentration of Ni may be decreased in a direction from the central portion to the surface within a range from about 0.95 to about 0.6. in an embodiment, the concentration of Ni may be decreased in a direction from the central portion to the surface within a range from about 0.9 to about 0.7.

In the Chemical Formula 1 above, when M1 and M2 are Co and Mn, respectively, a concentration of Mn may be continuously increased from the central portion to the surface or in the concentration gradient region. An amount of Mn may be increased in a direction toward the surface so that defects such as ignition or short-circuit due to penetration through the surface of the first cathode active material particle may be suppressed or reduced, and thus life-span of the lithium secondary battery may be enhanced.

In an embodiment, a concentration of cobalt may be substantially fixed or uniformly maintained throughout an entire region of the first cathode active material particle. Thus, a current or a charge flow through the first cathode active material particle may be uniformly maintained while improving the conductivity of the battery and maintaining low resistance.

As described above, the concentration ratio (or a molar ratio) of Ni:Co:Mn in the first cathode active material particle may be about 8:1:1. When the first cathode active material particle includes the concentration gradient, an average concentration of an entire region in the first cathode active material particle may be adjusted as about 8:1:1.

It exemplary embodiments, the first cathode active material particle may have a multi-crystalline structure. The term "multi-crystalline structure" used herein may indicate a secondary particle structure or shape formed by an assembly or agglomeration of a plurality of primary particles.

In this case, the first cathode active material particle may be formed by a co-precipitation method of metal precursors. For example, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a nickel precursor, a manganese precursor and a cobalt precursor.

In exemplary embodiments, a first precursor solution having a target composition at the central portion (e.g., concentrations of nickel, manganese and cobalt at the central portion) of the first cathode active material particle and a second precursor solution having a target composition at the surface or the surface portion (e.g., concentrations of nickel, manganese and cobalt at the surface) of the first cathode active material particle may be each prepared.

Subsequently, the first and second precursor solutions may be mixed and precipitates may be formed. While mixing the precursor solutions, a mixing ratio may be continuously changed so that a continuous concentration gradient may be formed from the target composition at the central portion to the target composition at the surface. Accordingly, the primary particles may be precipitated and aggregated while concentration thereof may be changed so that the secondary particle having the concentratio r gradient in an entire particle may be created, Thus, the first cathode active material particle having the concentration gradient as described above may be easily obtained.

In some embodiments, a chelate agent and a basic agent (e.g., an alkaline agent) may be added while forming the precipitate. In some embodiments, the precipitate may be thermally treated, and then a lithium salt may be mixed and thermally treated again.

In some embodiments, the first cathode active material particle may be prepared by a solid phase mixing/reaction, and a method of preparing the first cathode active material particle is not be limited to the solution-based process as described above.

The first cathode active material particle may be mixed and stirred together with a binder, a conductive agent and/or a dispersive additive in a solvent to form a slurry. The slurry may be coated on the cathode current collector 105, and pressed and dried to obtain the first cathode active material layer 112.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the first cathode active material layer 112, and an amount of the first cathode active material particles may be relatively increased. Thus, capacity and power output of the lithium secondary battery may be further improved.

The conductive agent may be added to facilitate electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The second cathode active material layer 114 may be formed on the first cathode active material layer 112. As illustrated in FIG. 1, the second cathode active material layer 114 may be directly formed on an upper surface of the first cathode active material layer 112, and may serve as a coating ayer of the cathode 100.

The second cathode active material layer 114 may include a second cathode active material particle. The second cathode active material particle may include a lithium metal oxide containing nickel and other transition metals. In exemplary embodiments, a nickel concentration (or molar ratio) in the second cathode active material particle may be less than that in the first cathode active material particle.

In exemplary embodiments, the second cathode active material particle may have a single crystalline structure. The term "single crystalline structure" used herein may indicate a single particle structure.

For example, the second cathode active material particle may substantially consist of the single particle structures, and a secondary particle structure formed from aggregation or assembly of primary particles may be excluded. In some embodiments, the second cathode ac material particle may include a structure in which a plurality of the primary particles may be integrally merged and converted into a substantially single particle.

In example embodiments, the second cathode active material particle may have a substantially constant or fixed concentration throughout an entire region of the particle. For example, concentrations of metals except for lithium may be substantially uniform or constant from a central portion of the particle to a surface of the particle in the second cathode active material particle.

In some embodiments, the second cathode active material particle gray include nickel (Ni), cobalt (Co) and manganese (Mn). As described above, concentrations or molar ratios of Ni, Co and Mn may be substantially uniform or constant throughout the entire region of the second cathode active material particle.

As described above, the concentration of nickel in the second cathode active material particle may be less than the concentration of nickel in the first cathode active material particle. In an embodiment, the concentration of nickel in the second cathode active material particle may be fixed to be less than the concentration of nickel at the surface of the first cathode active material particle.

It some embodiments, a molar ratio of Ni among metals except for lithium in the second cathode active material particle may be in a range from about 30% to about 60%. Within this range, sufficient thermal and penetration stability may be obtained from the second cathode active rrraterial layer 114 without degrading capacity/power output of the cathode 100.

In some embodiments, the second cathode active material particle ay include a lithium metal oxide represented by the following Chemical Formula 2-1.

$$Li_xNi_aCo_bMn_cM4_dM5_eO_y$$ [Chemical Formula 2-1]

In the Chemical Formula 2-1 above, M4 may include at least one element selected from Ti, Zr, Al, Mg, Si, B or Cr. M5 may include at least one element selected from Sr, Y, W or Mo. In Chemical Formula 2-1, $0<x<1.5$, $2≤y≤2.02$, $0.48≤a≤0.52$, $0.18≤b≤0.22$, $0.28≤c≤0.32$, $0≤d≤0.25$, $0≤e≤0.15$ and $0.98≤a+b+c≤1.02$, Preferably, $0.49≤a≤0.51$, $0.19≤b≤0.21$ and $0.29≤c≤0.31$.

As represented by Chemical Formula 2-1, an amount of Ni may be largest of those of the metals except for lithium in the second cathode active material particle in consideration of capacity and stability of the lithium secondary battery. For example, the concentrations may be decreased in a sequential order of Ni, Mn and Co. In a preferable embodiment, the concentration ratio of Ni:Co:Mn in the second cathode active material particle may be substantially about 5:2:3.

In some embodiments, the second cathode active material particle may include a lithium metal oxide represented by the following Chemical Formula 2-2.

$$Li_xNi_aCo_bMn_cM4_dM5_eO_y$$ [Chemical Formula 2-2]

In the Chemical Formula 2-2 above, M4 may include at least one element selected from Ti, Zr, Al, Mg, Si, B or Cr. M5 may include at least one element selected from Sr, Y, W or Mo. In Chemical Formula 2-2, $0<x<1.5$, $2≤y≤2.02$, $0.313≤a≤0.353$, $0.313≤b≤0.353$, $0.313≤c≤0.353$, $0≤d≤0.03$, $0≤e≤0.03$ and $0.98≤a+b+c≤1.02$. Preferably, $0.323≤a≤0.343$, $0.323≤b≤0.343$ and $0.323≤c≤0.343$.

In some embodiments, the second cathode active material particle may include a lithium metal oxide represented by the following Chemical Formula 2-3.

$$Li_xNi_aCo_bMn_cM4_dM5_eO_y$$ [Chemical Formula 2-3]

In the Chemical Formula 2-3 above, M4 may include at least one element selected from Ti, Zr, Al, Mg, Si, B or Cr. M5 may include at least one element selected from Sr, Y, W or Mo. In Chemical Formula 2-3, $0<x<1.2$, $2≤y≤2.02$, $0.585≤a≤0.615$, $0.185≤b≤0.215$, $0.185≤c≤0.215$, $0≤d≤0.03$, $0≤e≤0.03$ and $0.98≤a+b+c≤1.02$.

As indicated in Chemical Formulae 2-2 and 2-3, the second cathode active material particle may include Ni, Co and Mn by the same concentration or molar atio as each other, or may include Co and Mn by the same concentration or molar ratio in consideration of capacity and stability of the lithium secondary battery.

In some embodiments, the second cathode active material particle may be prepared by a solid state thermal treatment of the metal precursors. For example, a lithium precursor, the nickel precursor, the manganese precursor and the cobalt precursor may be mixed according to the composition of the Chemical Formula 2-1, 2-2 or 2-3 above to form a precursor powder.

The precursor powder may be thermally treated in a furnace at, e.g., a temperature from about 700° C. to about 1200° C., and the precursors may be merged or fused into a substantially single particle shape to obtain the second cathode active material particle having a single crystalline structure. The thermal treatment may be performed under an air atmosphere or an oxygen atmosphere so that the second cathode active material particle may be formed as a lithium metal oxide particle.

Within the above temperature range, generation of secondary particles ay be substantially suppressed, and the second cathode active material particle without defects therein may be achieved. Preferably, the thermal treatment may be performed at a temperature from about 800° C. to about 1000° C.

The second cathode active material may be mixed and stirred together with a binder, a conductive agent and/or a dispersive additive in a solvent to form a slurry. The slurry may be coated on the first cathode active material layer 112, and pressed and dried to obtain the second cathode active material layer 114. The binder and the conductive agent substantially the same as or similar to those used in the first cathode active material layer 112 may be also used.

As described above, the first cathode active material particle and the second cathode active material particle having different compositions or molar ratios may be included in different layers so that desired properties according to layer positions may be effectively implemented.

In exemplary embodiments, the first cathode active material layer 112 contacting the cathode current collector 105 may include the lithium metal oxide having a higher nickel amount than that of the second cathode active material particle in the second cathode active material layer 114. Thus, high capacity/power output may be effectively achieved from a current through the cathode current collector 105.

The second cathode active material layer 114 that may be exposed to an outer surface of the cathode 100 may include the second cathode active material particle having a relatively reduced nickel amount so that thermal stability and life-span stability may be enhanced.

As described above, the second cathode active material layer 114 may include the second cathode active material particle having the single particle or the single crystal cture to suppress a rapid propagation of cracks and thermal energy when an external object penetrates the lithium secondary battery. Thus, the second cathode active material layer 114 may substantially serve as a cathode coating layer improving penetration stability.

The first cathode active material layer 112 may include the first cathode active material particle having the concentration gradient so that thermal stability and life-span stability may be also improved at each surface of the particle in the first cathode active material layer 112. Further, the first cathode active material particle may have the secondary particle structure in which, e.g., rod-type individual primary particles are assembled so that ion mobility between the primary particles may be promoted to improve a charging/discharging rate and capacity retention.

In some embodiments, a diameter (e.g., $D_{50}$) of the second cathode active material particle may be less than a diameter of the first cathode active material particle. Accordingly, a packing property in the second cathode active material layer 114 may be enhanced, and thus the propagation of thermal energy and cracks when being penetrated or pressed may be suppressed or reduced.

For example, an average diameter of the second cathode active material particle may be in a range from about 1 μm to about 10 μm, preferably from about 1 μm to about 8 μm, more preferably from about 2 μm to about 7 μm. An average diameter of the first cathode active material particle may be in a range from about 7 μm to about 15 μm.

In some embodiments, the first cathode active material particle and/or the second cathode active material particle may further include a coating on a surface thereof. For example, the coating may include Al, Ti, Ba, Zr, Si, B, Mg, P, W, an alloy thereof or on oxide thereof. These may be used alone or in a combination thereof. The first cathode active material particle may be passivated by the coating so that penetration stability and life-span of the battery may be further improved.

In an errrbodiment, the elements, the alloy or the oxide of the coating may be inserted in the first cathode active material particle as dopants.

In some embodiments, a thickness of the second cathode active material layer 114 may be less than that of the first cathode active material layer 112. Accordingly, the second cathode active material layer 114 may serve as a coating layer providing a penetration barrier, and the first cathode active material layer 112 may serve as an active layer providing power output/capacity.

For example, the thickness of the first cathode active ayer 112 may be in a range from about 50 μm to about 200 μm. The thickness of the second cathode active material layer 114 may be in a range from about 10 μm to about 100 μm.

Figure 2:
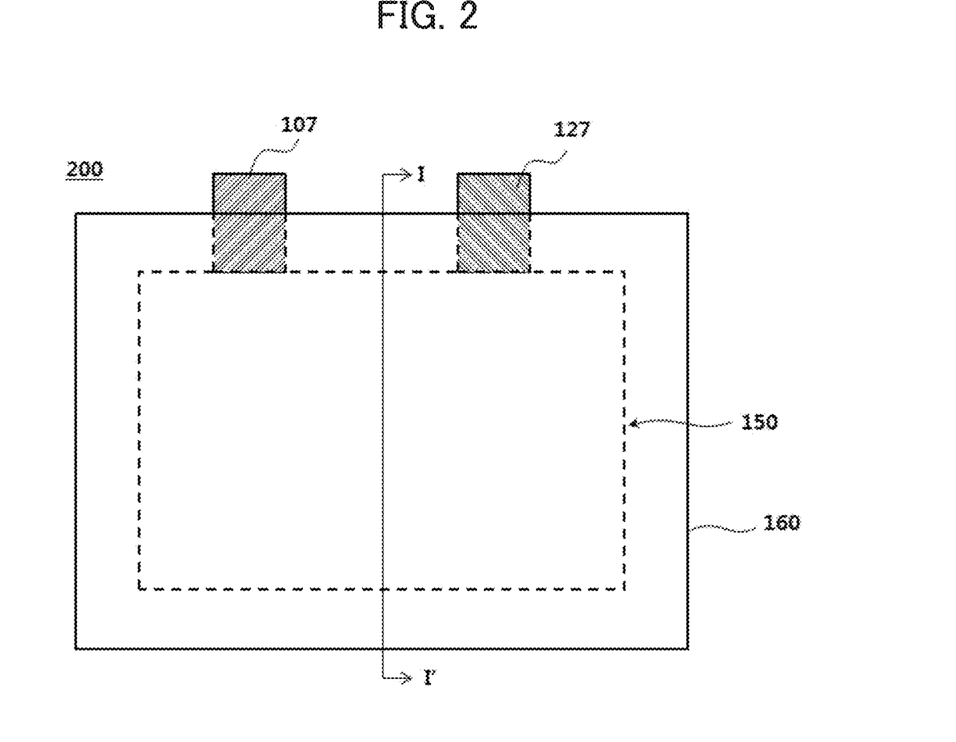
FIGS. 2 and 3 are a top planar view and a cross-sectional view, respectively, schematically illustrating a lithium secondary battery in accordance with exemplary embodiments.
Figure 3:
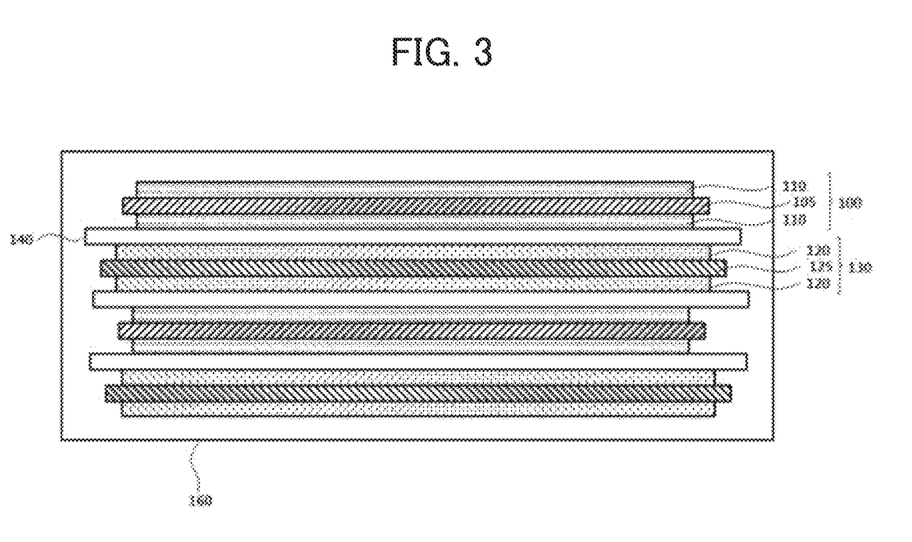

FIGS. 2 and 3 are a top planar view and a cross-sectional view, respectively, schematically illustrating a lithium secondary battery in accordance with exemplary embodiments. Specifically, FIG. 3 is a cross-sectional view taken along a line of FIG. 2 in a thickness direction of the lithium secondary battery.

Referring to FIGS. 2 and 3, a lithium secondary battery 200 may include an electrode assembly 150 housed in a case 160. The electrode assembly 150 may include a cathode 100, an anode 130 and a separation layer 140 repeatedly stacked as illustrated in FIG. 3.

The cathode 100 may include a cathode active material layer 110 coated on the cathode current collector 105. As described with reference to FIG. 1, the cathode active material layer 110 may include a multi-layered structure including the first cathode active material layer 112 and the second cathode active material layer 114.

The anode 130 may include an anode current collector 125 and an anode active material layer 120 formed by coating an anode active material on the anode current collector 125.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 125 may include gold, stainless-steel, nickel, aluminum, titanium, copper or an alloy thereof, preferably, may include copper or a copper alloy.

In some embodiments, the anode active material may be mixed and stirred together with a binder, a conductive agent and/or a dispersive additive in a solvent to form a slurry. The slurry may be coated on the anode current collector 125, and pressed and dried to obtain the anode 130.

The binder and the conductive agent substantially the same as or similar to those as mentioned above may be used. In some embodiments, the binder for the anode 140 may include an aqueous binder such as such as styrene-butadiene rubber (SBR) that may be used with a thickener such as carboxytnethyl cellulose (CMC) so that compatibility with the carbon-based active material may be improved.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylenelhexene copolymer, an ethylene/methacrylate copolymer, or the like. The separation layer 140 may be also formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, precipitation or sedimentation. Therefore, the enhancement of power and stability by the combination of the first and second cathode active material layers 112 and 114 may be effectively implemented.

In exemplary embodiments, an electrode cell may be defined by the cathode 100, the anode 130 and the separation layer 140, and a plurality of the electrode cells may be stacked to form an electrode assembly 150 having, e.g., a jelly roll shape. For example, the electrode assembly 150 may be formed by winding, laminating or folding of the separation layer 140.

The electrode assembly 150 may be accommodated in an outer case 160 together with an electrolyte to form the lithium secondary battery, in exemplary embodiments, the electrolyte may include a non-aqueous electrolyte solution.

The non-aqueous electrolyte solution may include a lithium salt and an organic solvent. The lithium salt may be represented by and an anion of the lithium salt $X^-$ may include, e.g., $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, an electrode tab (a cathode tab and an anode tab) may be fonned from each of the cathode current collector 105 and the anode current collector 125 to extend to one end of the outer case 160. The electrode tabs may be welded together with the one end of the outer case 160 to form an electrode lead (a cathode lead 107 and an anode lead 127) exposed at an outside of the outer case 160.

FIG. 2 illustrates that the cathode lead 107 and the anode lead 127 protrude from an upper side of the outer case 160 in a planar view. However, positions of the electrode leads are not specifically limited. For example, the electrode leads may protrude from at least one of lateral sides of the outer case 160, or may protrude from a lower side of the outer case 160. Further, the cathode lead 107 and the anode lead 127 may protrude from different sides of the outer case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE 1

(1) Preparation of First Cathode Active Material Particle

A total target composition was $LiNi_{0.8}Co_{0.1}Mn_{0.1}O_2$, a target composition at a core region was $LiNi_{0.84}2Co_{0.11}Mn_{0.05}O_2$, and a target composition at a shell region was $LiNi_{0.78}Co_{0.10}Mn_{0.12}O_2$. A concentration gradient region (decreasing Ni concentration and increasing Mn concentration) was formed between the core region and the shell region by continuously changing a mixing ratio of Ni and Mn precursors to form precipitates and obtain the first cathode active material particle (hereinafter, abbreviated as NCM811).

Figure 4:
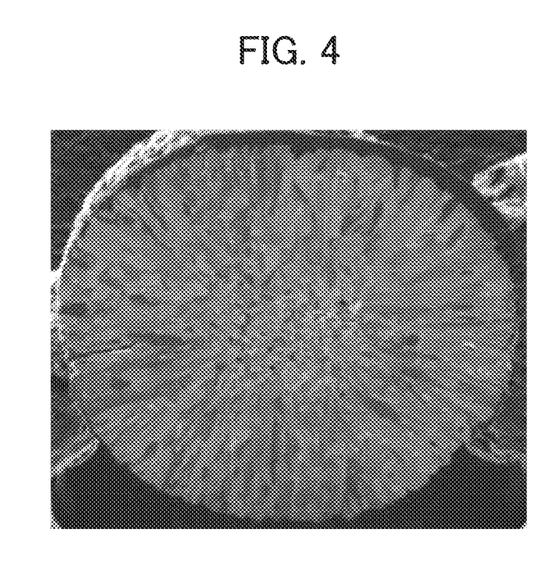
FIG. 4 is a cross-sectional SEM (Scanning Electron Microscope) image of a first cathode active material particle prepared by Example.

As shown in FIG. 4, the first cathode active material particle was formed to have a secondary particle structure (e.g., multi-crystalline structure) in which primary particles were assembled.

(2) Preparation of Second Cathode Active Material Particle $Ni_{1/3}Co_{1/3}Mn_{1/3}(OH)_2$ as an NCM precursor, and $Li_2CO_3$ and LiOH as lithium sources were gtinded and mixed for 20 minutes. The mixed power was fired at a temperature between 900° C. and 1000° C., for 15 hours, and then grinding, sieving and de-ironing processes were performed to obtain $LiNi_{1/3}Co_{1/3}Mn_{1/3}O_2$ (hereinafter, abbreviated as single crystalline NCM111) of a single particle type (an average diameter ($D_{50}$): 6 μm).

Figure 5:
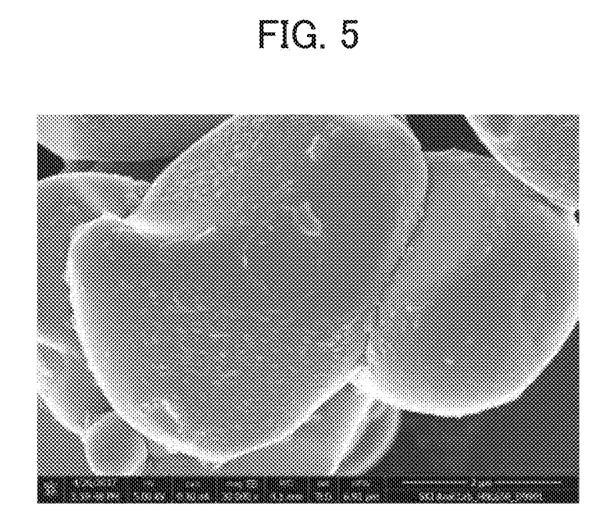
FIGS. 5 and 6 are a surface SEM image and a cross-sectional SEM image, respectively, of a second cathode active material particle prepared by Example.
Figure 6:
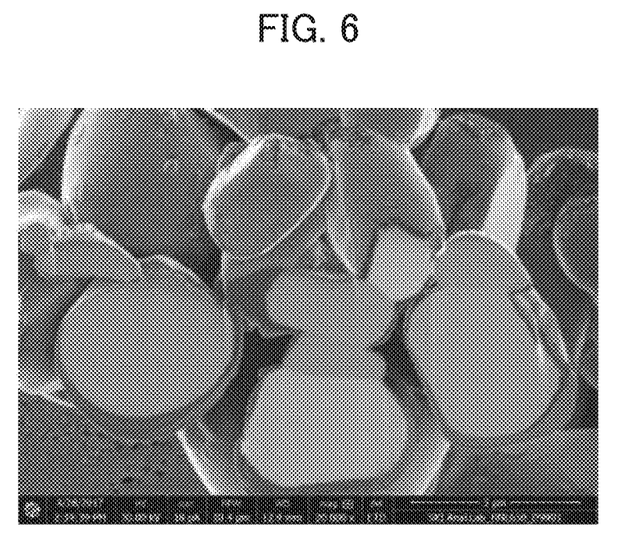

As shown in FIGS. 5 and 6, the second cathode active material particle was formed as a single particle having a single crystalline structure.

(3) Fabrication of Secondary Battery

The first cathode active material particle, Denka. Black as a conductive agent, and PVDF as a binder were mixed by a weight ratio of 92:5:3 to form a first cathode mixture. The first cathode mixture was coated, dried, and pressed on an aluminum substrate to form a first cathode active material layer.

The second cathode active material particle, Denka Black as a conductive agent, and PVDF as a binder were mixed by a weight ratio of 92:5:3 to form a second cathode mixture. The second cathode mixture was coated, dried, and pressed on a surface of the first cathode active material layer to form a second cathode active material layer. Accordingly, a cathode including the first cathode active material layer and the second cathode active material layer sequentially formed on the cathode current collector was obtained.

In the finally obtained cathode, an electrode density and a thickness of the first cathode active material layer were 3.5 g/cc and 114 μm. An electrode density and a thickness of the second cathode active material layer were 3.7 g/cc and 50 μm.

An anode slurry was prepared by mixing 93 wt % of a natural graphite as an anode active material, 5 wt % of a flake type conductive agent KS6, 1 wt % of SBR as a binder, and 1 wt % of CMC as a thickener. The anode slurry was coated, dried, and pressed on a copper substrate to form an anode.

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathodelseparatorlanode asserr bly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

EXAMPLE 2

A lithium secondary battery was fabricated by a method the same as that of Example 1 except that a second cathode active material particle prepared as follows was used.

$Ni_{0.5}Co_{0.2}Mn_{0.3}(OH)_2$ as an NCM precursor, and $Li_2CO_3$ and LiOH as lithium sources were grinded and mixed for 20 minutes. The mixed power was fired at 1000° C., for 15 hours, and then grinding, sieving and de-ironing processes rformed to obtain $LiNi_{0.5}Co_{0.2}Mn_{0.3}O_2$ (hereinafter, abbreviated as single crystalline NCM523) of a single particle type.

EXAMPLE 3

A lithium secondary battery was fabricated by a method the same as that of Example 1 except that a first cathode active material particle having a secondary particle structure with the same total composition as that in Example 1 without a concentration gradient (a molar ratio of Ni, Co and Mn was fixed to 8:1:1 throughout an entire region) was used.

EXAMPLE 4

A lithium secondary battery was fabricated by a method the same as that of Example 2 except that the first cathode active material particle of Example 3 was used.

EXAMPLE 5

A lithium secondary battery was fabricated by a method the same as that of Example 1 except that $LiNi_{0.6}Co_{0.2}Mn_{0.2}O_2$ (abbreviated as single crystalline NCM622) of a single particle type was used as the second cathode active material particle.

EXAMPLE 6

A lithium secondary battery was fabricated by a method the same as that of Example 3 except that $LiNi_{0.6}Co_{0.2}Mn_{0.2}O_2$ (abbreviated as single crystalline NCM622) of a single particle type was used as the second cathode active material particle.

COMPARATIVE EXAMPLE 1

A lithium secondary battery was fabricated by a method the same as that of Example 1 except that a single-layered cathode active material layer with the same thickness was formed using the first cathode active material particle.

COMPARATIVE EXAMPLE 2

A lithium secondary battery was fabricated by a method the same as that of Example 3 except that a single-layered cathode active material layer with the same thickness was formed using the first cathode active material particle.

COMPARATIVE EXAMPLE 3

A lithium secondary battery was fabricated by a method the same as that of Example 1 except that $LiNi_{0.5}Co_{0.2}Mn_{0.3}O_2$ (hereinafter, abbreviated as a multi-crystalline NCM523) having a secondary particle structure without a concentration gradient (having a fixed concentration throughout an entire region) was used as the second cathode active material particle.

EXPERIMENTAL EXAMPLE (1) Evaluation on Life-Span Property at Room Temperature 500 cycles of a charging (CC-CV 1.0 C 4.2V 0.05C CUT-OFF) and a discharging (CC 1.0C 2.7V CUT-OFF) were repeated using the secondary batteries of Examples and Comparative Examples. A life-span property was measured by a percentage (%) of a discharging capacity at a 500th cycle with respect to that at a first cycle.

(2) Evaluation on Penetration Stability

Secondary batteries of Examples and Comparative Examples were charged 1C 4.2V 0.1C CUT-OFF), and then penetrated from an outside of the batteries by a nail having a diameter of 3 mm at a rate of 80 mm/sec. A penetration stability was evaluated based on a standard below.

<Penetration Stability, EIJCAR Hazard Level>

L1: No malfunction occurs from the battery

L2: Irreversible damages of the battery occur

L3: A weight of an electrolyte in the battery was decreased by a ratio less than 50%

L4: A weight of an electrolyte in the battery was decreased by a ratio of 50% or more
L5: Ignition or explosion occurs
The results are shown in Table 1 below.

TABLE 1

|  | Construction of Cathode Active Material Layer | Life-span (%) (500cycle) | Penetration Stability |
|---|---|---|---|
| Example 1 | First cathode active material layer: Concentration gradient NCM811 Second cathode active material layer: Single crystalline NCM111 | 98.1% | L3 |
| Example 2 | First cathode active material layer: Concentration gradient NCM811 Second cathode active material layer: Single crystalline NCM523 | 98.3% | L4 |
| Example 3 | First cathode active material layer: Fixed concentration NCM811 Second cathode active material layer: Single crystalline NCM111 | 92.3% | L3 |
| Example 4 | First cathode active material layer: Fixed concentration NCM811 Second cathode active material layer: Single crystalline NCM523 | 93.1% | L4 |
| Example 5 | First cathode active material layer: Concentration gradient NCM811 Second cathode active material layer: Single crystalline NCM622 | 94.3% | L4 |
| Example 6 | First cathode active material layer: Fixed concentration NCM811 Second cathode active material layer: Single crystalline NCM622 | 91.3% | L4 |
| Comparative Example 1 | Single layer of Concentration gradient NCM811 | 98.2% | L5 |
| Comparative Example 2 | Single layer of fixed concentration NCM811 | 90.5% | L5 |
| Comparative Example 3 | First cathode active material layer: Concentration gradient NCM811 Second cathode active material layer: Multi-crystalline NCM523 | 93.5% | L5 |

Referring to Table 1, the batteries of Examples including the first cathode active material layer with a relatively high Ni amount and the second cathode active material layer with the single crystalline NCM-based active material showed greater penetration stability than those of the batteries in Comparative Examples. Additionally, when the concentration gradient was included in the first cathode active material layer, life-span property was further improved.

The battery of Comparative Example 3 having the second cathode active material layer with the multi-crystalline cathode active material particle showed degraded life-span and penetration stability compared to that of the battery in Example

What is claimed is:

1. A lithium secondary battery, comprising:
a cathode including a cathode current collector, a first cathode active material layer formed on the cathode current collector, and a second cathode active material layer formed on the first cathode active material layer;
an anode; and
a separation layer interposed between the cathode and the anode,
wherein a cathode active material included in the first cathode active material layer consists of a first lithium metal oxide particle having a secondary particle structure in which primary particles are assembled,
wherein a cathode active material included in the second cathode active material layer consists of a second lithium metal oxide particle having a single particle structure which is not the secondary particle structure in which primary particles are assembled, and
wherein each of the first lithium metal oxide particle and the second lithium metal oxide particle contains nickel.

2. The lithium secondary battery according to claim 1, wherein a concentration of nickel in the second lithium metal oxide particle is less than that in the first lithium metal oxide particle.

3. The lithium secondary battery according to claim 2, wherein a molar ratio of nickel among metals except for lithium in the first lithium metal oxide particle is 60% or more.

4. The lithium secondary battery according to claim 1, wherein the first lithium metal oxide particle includes a concentration gradient region between a central portion and a surface, and a concentration gradient of at least one metal is formed in the concentration gradient region.

5. The lithium secondary battery according to claim 4, wherein a nickel concentration of the first lithium metal oxide particle continuously decreases in the concentration gradient region in a direction from the central portion to the surface.

6. The lithium secondary battery according to claim 5, wherein the first lithium metal oxide particle further includes cobalt and manganese, and
wherein a concentration of manganese continuously increases in the concentration gradient region in a direction from the central portion to the surface.

7. The lithium secondary battery according to claim 1, wherein the first lithium metal oxide particle is represented by Chemical Formula 1 below:

$$LiNi_xNi_aM1_bM2_cO_y \qquad \text{[Chemical Formula 1]}$$

wherein, in the Chemical Formula 1 above, M1 and M2 are each selected from Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0.6\leq a\leq0.95$ and $0.05\leq b+c\leq0.4$.

8. The lithium secondary battery according to claim 1, wherein a molar ratio of nickel among metals except for lithium in the second lithium metal oxide particle is in a range from 30% to 60%.

9. The lithium secondary battery according to claim 1, wherein a nickel concentration of the second lithium metal oxide particle is uniform from a central portion to a surface.

10. The lithium secondary battery according to claim 1, wherein the second lithium metal oxide particle is represented by Chemical Formulae 2-1, 2-2 or 2-3:

$$Li_xNi_aCo_bMn_cM4_dM5_eO_y \quad \text{[Chemical Formula 2-1]}$$

wherein, in the Chemical Formula 2-1 above, M4 is at least one element selected from Ti, Zr, Al, Mg, Si, B or Cr, and M5 is at least one element selected from Sr, Y, W or Mo, wherein $0<x<1.5$, $2\leq y\leq2.02$, $0.48\leq a\leq0.52$, $0.18\leq b\leq0.22$, $0.28\leq c\leq0.32$, $0\leq d\leq0.25$, $0\leq e\leq0.15$ and $0.98\leq a+b+c\leq1.02$, $$Li_xNi_aCo_bMn_cM4_dM5_eO_y \quad \text{[Chemical Formula 2-2]}$$

wherein, in the Chemical Formula 2-2 above, M4 is at least one element selected from Ti, Zr, Al, Mg, Si, B or Cr, and M5 is at least one element selected from Sr, Y, W or Mo, wherein $0<x<1.5$, $2\leq y\leq2.02$, $0.313\leq a\leq0.353$, $0.313\leq b\leq0.353$, $0.313\leq c\leq0.353$, $0\leq d\leq0.03$, $0\leq e\leq0.03$ and $0.98\leq a+b+c\leq1.02$, $$Li_xNi_aCo_bMn_cM4_dM5_eO_y \quad \text{[Chemical Formula 2-3]}$$

wherein, in the Chemical Formula 2-3 above, M4 is at least one element selected from Ti, Zr, Al, Mg, Si, B or Cr, and M5 is at least one element selected from Sr, Y, W or Mo, wherein $0<x<1.2$, $2\leq y\leq2.02$, $0.585\leq a\leq0.615$, $0.185\leq b\leq0.215$, $0.185\leq c\leq0.215$, $0\leq d\leq0.03$, $0\leq e\leq0.03$ and $0.98\leq a+b+c\leq1.02$.

11. The lithium secondary battery according to claim 1, wherein an average diameter of the second lithium metal oxide particle is smaller than that of the first lithium metal oxide particle.

12. The lithium secondary battery according to claim 1, wherein a thickness of the second cathode active material layer is smaller than that of the first cathode active material layer.

* * * * *